US009288255B2

(12) United States Patent
Ko et al.

(10) Patent No.: US 9,288,255 B2
(45) Date of Patent: Mar. 15, 2016

(54) APPARATUS AND METHOD FOR PROCESSING HTTP MESSAGE

(71) Applicant: Samsung Electronics Co. Ltd., Suwon-si, Gyeonggi-do (KR)

(72) Inventors: Kwangtae Ko, Suwon-si (KR); Sunghak Lee, Seogwipo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 14/063,484

(22) Filed: Oct. 25, 2013

(65) Prior Publication Data
US 2014/0164560 A1    Jun. 12, 2014

(30) Foreign Application Priority Data

Dec. 6, 2012    (KR) .......................... 10-2012-0141260

(51) Int. Cl.
  *H04L 29/08*    (2006.01)
  *G06F 17/30*    (2006.01)
  *H04L 29/12*    (2006.01)
(52) U.S. Cl.
  CPC ............... *H04L 67/02* (2013.01); *G06F 17/30* (2013.01); *G06F 17/30861* (2013.01); *H04L 67/289* (2013.01); *H04L 67/2814* (2013.01); *H04L 61/305* (2013.01); *H04L 61/609* (2013.01)
(58) Field of Classification Search
  None
  See application file for complete search history.

(56) References Cited

U.S. PATENT DOCUMENTS

| 6,345,264 | B1* | 2/2002 | Breese ............. G06F 17/30867 706/21 |
|---|---|---|---|
| 2002/0178170 | A1* | 11/2002 | Britton ............. G06F 17/30867 |
| 2003/0039341 | A1* | 2/2003 | Burg ....................... H04M 1/64 379/88.16 |
| 2003/0046361 | A1* | 3/2003 | Kirsch ............. G06F 17/30876 709/217 |
| 2003/0135566 | A1* | 7/2003 | Nishiguchi ........... H04L 12/587 709/206 |
| 2005/0071601 | A1* | 3/2005 | Luick .................. G06F 12/0862 711/206 |
| 2005/0289561 | A1* | 12/2005 | Torres ................... G06F 9/4443 719/328 |
| 2006/0068813 | A1* | 3/2006 | Ku ........................ H04W 68/04 455/458 |
| 2006/0085766 | A1* | 4/2006 | Dominowska .... G06F 17/30873 715/854 |
| 2006/0092864 | A1* | 5/2006 | Gupta ..................... H04L 67/00 370/278 |

(Continued)

OTHER PUBLICATIONS

Hypertext Transfer Protocol—HTTP/1.1 (rfc 2616), P.61, IETF/W3C, (http://tools.ietf.org/html/rfc2616), Jun. 1999.

*Primary Examiner* — Ninos Donabed
(74) *Attorney, Agent, or Firm* — Jefferson IP Law, LLP

(57) ABSTRACT

A method and an apparatus of processing HyperText Transfer Protocol (HTTP) message for facilitating download of user-intended information from a web server are provided. The method includes detecting a Uniform Resource Locator (URL) entry, transmitting, when at least one predictive URL corresponding to the URL entry exists in a redirect history database (DB), to the network first request messages including the respective URL entry and the at least one predictive URL, receiving first response messages from the network in response to the first request messages, determining whether a success message is valid among the first response messages, and determining, when the success message is valid, data carried in the success message as a resource to be presented to a user.

15 Claims, 6 Drawing Sheets

(56) References Cited

U.S. PATENT DOCUMENTS

| | | | |
|---|---|---|---|
| 2007/0022479 A1* | 1/2007 | Sikdar | H04L 63/0218 726/22 |
| 2007/0208728 A1* | 9/2007 | Zhang | G06F 17/30864 |
| 2008/0320031 A1* | 12/2008 | Denoual | G06F 17/2247 |
| 2009/0132529 A1* | 5/2009 | Gibbs | G06F 17/30887 |
| 2009/0254522 A1* | 10/2009 | Chaudhuri | G06Q 30/0202 |
| 2009/0254774 A1* | 10/2009 | Chamdani | G06F 9/4881 714/2 |
| 2010/0274901 A1* | 10/2010 | Eidenschink | H04L 41/0896 709/226 |
| 2012/0100838 A1* | 4/2012 | Kieser | G06F 17/30887 455/414.4 |
| 2013/0036117 A1* | 2/2013 | Fisher | G06F 17/30041 707/736 |
| 2014/0123065 A1* | 5/2014 | Bos | G06F 3/0237 715/816 |

\* cited by examiner

APPARATUS AND METHOD FOR PROCESSING HTTP MESSAGE

PRIORITY

This application claims the benefit under 35 U.S.C. §119(a) of a Korean patent application filed on Dec. 6, 2012 in the Korean Intellectual Property Office and assigned Serial No. 10-2012-0141260, the entire disclosure of which is hereby incorporated by reference.

BACKGROUND OF THE INVENTION

1. Field of the Invention

The present invention relates to a HyperText Transfer Protocol (HTTP) message processing method and apparatus. More particularly, the present invention relates to a HTTP message processing method and apparatus for facilitating download of user-intended information from a web server.

2. Description of the Related Art

HTTP is a protocol that handles transferring data through the World Wide Web (WWW). HTTP is mainly used for exchanging a HyperText Markup Language (HTML) message (document). HTTP version 1.1 is the most commonly used version. HTTP is a request/response protocol used in a client-server computing model. For example, a browser of a client requests a server for a webpage or picture information through HTTP, the server transfers the corresponding information to the browser in response to the request. This transferred information is presented to the user through an output device such as a monitor. The data provided to the user through HTTP can be queried with a Uniform Resource Locator (URL) starting with "http:".

The user may visit a website by entering the URL in a URL bar of a web browser. The user enters a well-known and simple address corresponding to a long and complex address of an original website. This is possible because the entered address is redirected to the real address of the website.

FIG. 1 is a flowchart illustrating a conventional address redirection procedure according to the related art.

Prior to explanations, brief descriptions may be made of the HTTP messages. In HTTP version 1.1, "Get request" message is a message used for the client to request a server for transmission of the data corresponding to the URL. If the client connects to the server and makes a request to the server, the server sends the client a response message including a 3-bit status code. The response message including a status code starting with 3, i.e. 3XX, is a message indicating that a data location is changed. For example, the status code '301' indicates that the requested data is located at a changed URL. That is, the response message including the status code '301' is the redirect message including the location information (changed URL). The response message including status code '302' is also the redirect message but differs from the response message including status code '301' in that the changed URL is a temporary storage. This indicates that the URL may be changed by the server anytime. The response message including the status code '302' is referred to as "Moved Temporarily" or "Found". The response message including the status code starting with 2, i.e. 2XX, is the message indicating that the data transmission is successful or that the user request is understood or accepted (success message). For example, the status code '200' indicates that the transmission is successful without error. That is, this message carries the data requested by the user to the client.

Referring to FIG. 1, the user inputs 'naver.com' in the URL bar of a mobile browser and selects 'send' button (e.g. enter button). That is, the portable terminal sends the network a first GET request message including the URL, i.e. 'naver.com, at step 110. Next, the portable terminal receives a first redirect message including the status code '301' and location information 'www.naver.com' at step 120. Thereafter, the portable terminal extracts the location information 'www.naver.com' from the first redirect message and sends the network a second GET request message including 'www.naver.com' at step 130. The server of the network receives the second GET request message from the portable terminal, parses the second GET request message, and sends, when the client is verified as the terminal which has transmitted the message through the mobile browser, the client a second Redirect message. The portable terminal receives the second Redirect message including the status code '302' and location information 'm.naver.com' at step 140. Next, the portable terminal extracts the location information 'm.naver.com' from the second Redirect message and sends the network a third GET request message including 'm.naver.com' at step 150. Finally, the portable terminal receives a success message including the status code '200' and requested data at step 160. The portable terminal is capable of extracting the data (e.g. webpage, streaming audio data, streaming video data, etc.) from the success message, as noted at step 160, and providing the user with the extracted data through output devices.

However, the conventional redirect procedure, as illustrated in FIG. 1, has a drawback of long data loading time due to the repeated exchange of GET request and Redirect message. Furthermore, the redirection procedure is repeated much more when the original domain name such as 'naver.com' is entered in the URL bar of the mobile browser.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an HTTP message processing method and apparatus that is capable of facilitating user-requested data provision by predicting the original URL corresponding to the requested URL.

In accordance with an aspect of the present invention, a HyperText Transfer Protocol (HTTP) message processing method of an apparatus capable of connecting to a network is provided. The method includes detecting a Uniform Resource Locator (URL) entry, transmitting, when at least one predictive URL corresponding to the URL entry exists in a redirect history database (DB), to the network first request messages including the respective URL entry and the at least one predictive URL, receiving first response messages from the network in response to the first request messages, determining whether a success message is valid among the first response messages, and determining, when the success message is valid, data carried in the success message as resource to be presented to a user.

In accordance with another aspect of the present invention, a HyperText Transfer Protocol (HTTP) message processing apparatus is provided. The apparatus includes an input unit which receives a Uniform Resource Locator (URL) entry, a radio communication unit which transmits to a network first request messages including the respective URL entry and the at least one predictive URL and receives first response messages from the network in response to the first request messages, and a control unit which determines whether a success message is valid among the first response messages and determines, when the success message is valid, data carried in the success message as resource to be presented to a user.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
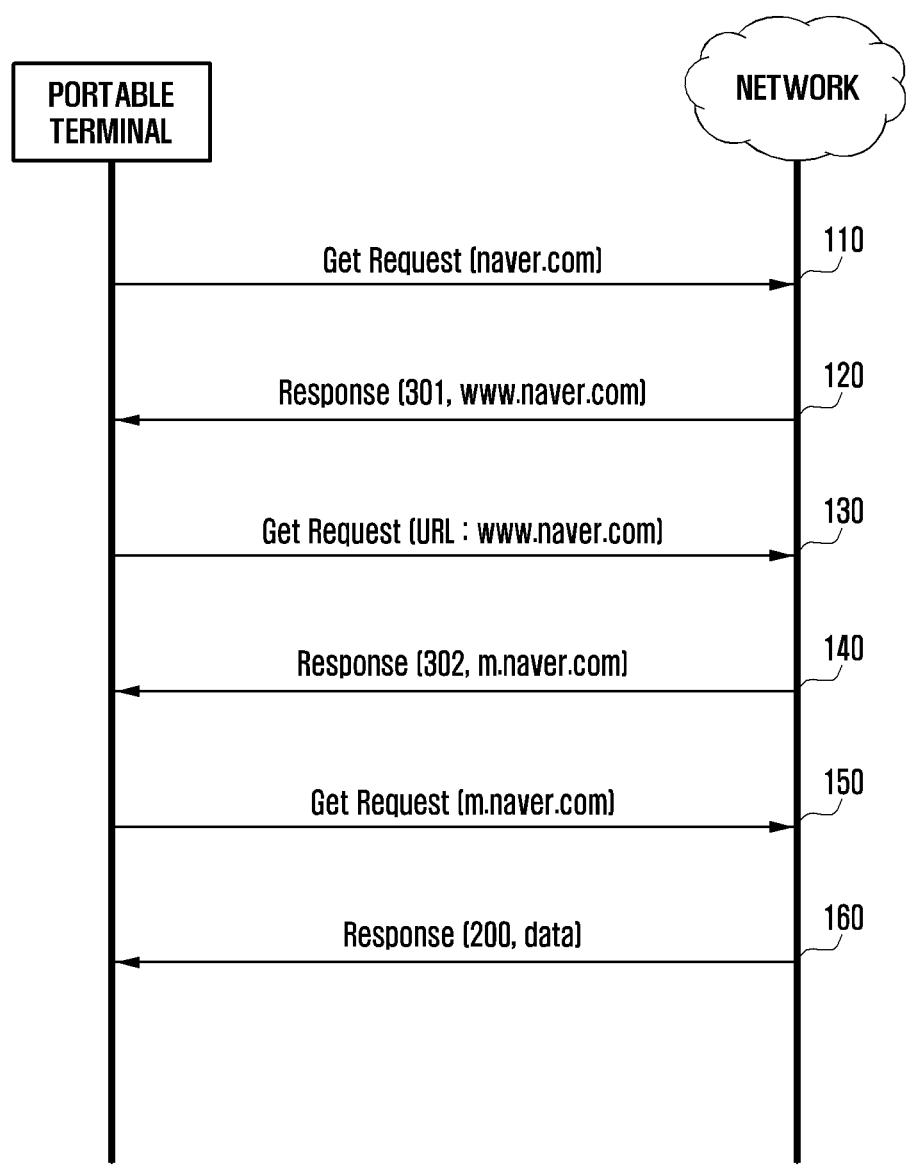
FIG. 1 is a flowchart illustrating a conventional address redirection procedure according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

It is to be understood that the singular forms "a," "an," and "the" include plural referents unless the context clearly dictates otherwise. Thus, for example, reference to "a component surface" includes reference to one or more of such surfaces.

The HTTP message processing method and apparatus according to an exemplary embodiment of the present invention is capable of connecting to a network and applicable to various types of electronic devices equipped with a browser capable of processing an HTTP message. Here, the electronic devices include portable electronic devices such as a Personal Computer (PC), a desktop PC and a laptop PC for example, a smartphone, a cellular phone, a Personal Multimedia Player (PMP), a tablet PC, a navigator, and a portable game console, and appliances such as a Audio/Video (A/V) device, a Television (TV), a smart hub device, and a file server.

Exemplary embodiments of the present invention are described with reference to the accompanying drawings in detail. Detailed description of well-known functions and structures incorporated herein may be omitted to avoid obscuring the subject matter of the exemplary embodiments of the present invention.

Terms and words used in the specification and claims must be regarded as concepts selected by the inventor as the best method of illustrating the present invention, and must be interpreted as having meanings and concepts adapted to the scope and spirit of the present invention to understand the technology of the present invention. Therefore, the exemplary embodiments described in the specification and the constructions illustrated in the drawings correspond to only the most preferable exemplary embodiments, but do not represent all of the technical spirit of the present invention. Accordingly, it should be understood that various equivalents and modifications can substitute them at the time of filing the present invention. Although the description is directed to an apparatus equipped with a touchscreen as an input device, the exemplary embodiments of the present invention are applicable to apparatuses equipped with other types of input devices such as mouse and joystick.

Figure 2:
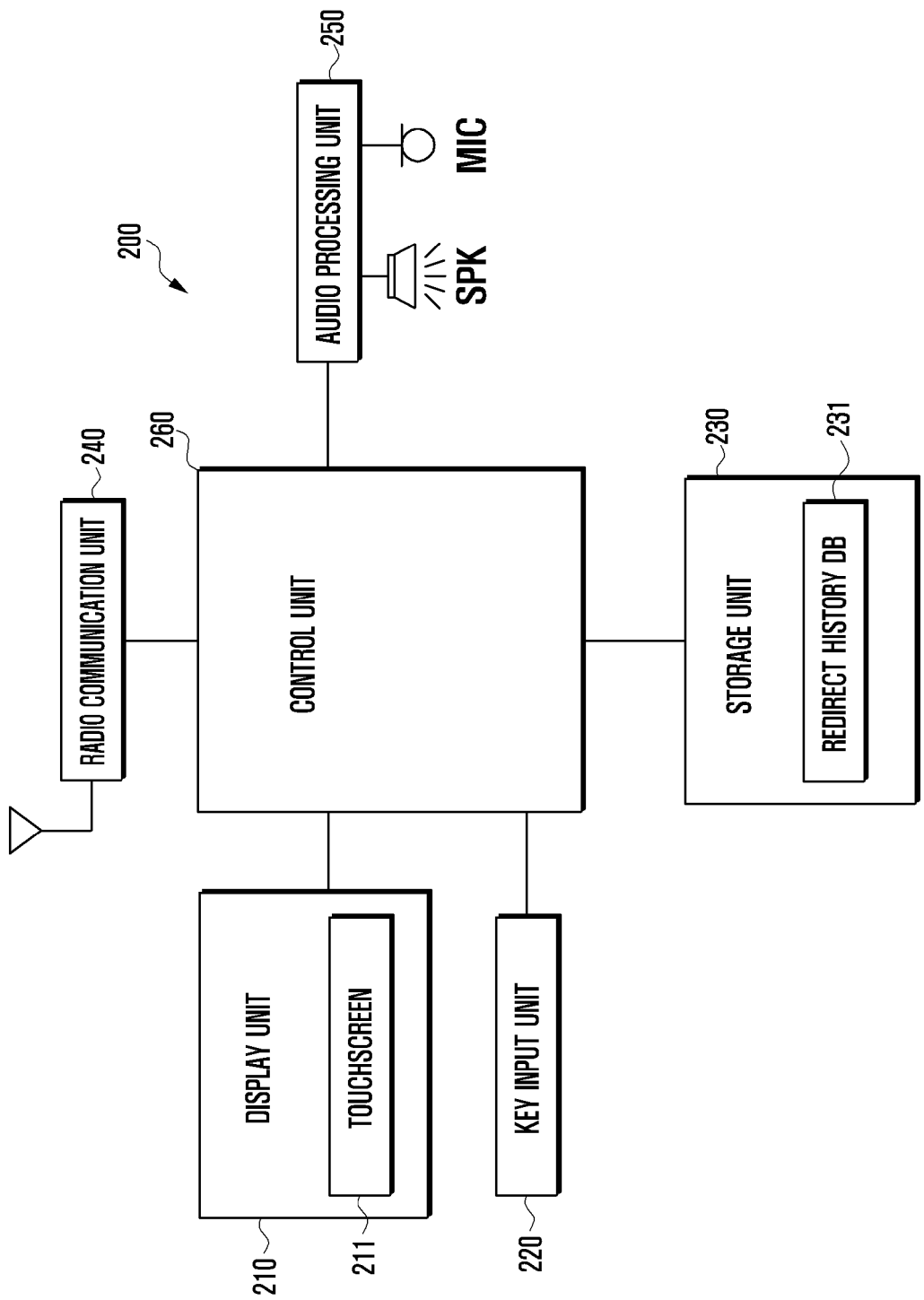
FIG. 2 is a block diagram illustrating a configuration of an HTTP message processing apparatus according to an exemplary embodiment of the present invention.

FIG. 2 is a block diagram illustrating a configuration of an HTTP message processing apparatus according to an exemplary embodiment of the present invention.

Referring to FIG. 2, the HTTP message processing apparatus 200 includes a display unit 210, a key input unit 220, a storage unit 230, a radio communication unit 240, an audio processing unit 250, a speaker (SPK), a microphone (MIC), and a control unit 260.

The display unit 210 converts the video data from the control unit 260 to analog signal to display an image under the control of the control unit 260. That is, the display unit 210 is capable of displaying various screens associated with the operations of the apparatus 200, e.g. lock screen, home screen, application (or App) execution screen, and keypad. The lock screen is the screen of the image displayed when the display unit 210 powers on. If a user's gesture for unlocking the screen is detected, the control unit 260 is capable of changing the lock screen to the home screen or the application execution screen. If one of plural application icons is selected by the user (e.g. tap on icon), the control unit 260 executes the corresponding application (e.g. browser) and displays the execution screen of the application through the display unit 210. The display unit 210 is capable of displaying the application execution screen and the keypad overlaid on the application execution screen. The display unit 210 may be implemented with one of Liquid Crystal Display (LCD), Organic Light Emitting Diode (OLED), Active Matrix OLED (AMOLED), and Flexible display. The display unit 210 may include a touchscreen 211 to provide the user with an interactive user interface. The touchscreen 211 may be placed on the display unit 210. The touchscreen 211 generates an analog signal (e.g. touch event) in response to the user's gesture made on the touchscreen 211 and performs Analog/Digital (A/D) conversion on the analog signal to generate a digital signal to the control unit 260. The control unit 260 detects the user gesture based on the received touch event. The user's gesture may be classified into one of touch and touch gesture. The touch gestures include tap, double tap, long tap, drag, drag & drop, flick, press, etc. That is, the term 'touch' denotes the state of maintaining contact on the screen, and the term 'touch gesture' denotes the behavior from the touch-on to the touch-off state on the touchscreen 211. The touch screen 211 may include a pressure sensor (not shown) capable of sensing the pressure at the touch position. The detected pressure information is sent to the control unit 260 such that the control unit 260 distinguishes the press from the touch based on the detected pressure information.

The touchscreen 211 may be implemented as a combined touch panel (not shown) including a finger touch panel for detecting a gesture made by a human body and a pen touch panel for detecting a pen gesture made by a pen. Here, the finger touch panel may be implemented as a capacitive type panel. Here, the finger touch panel is capable of detecting the touch gesture made by a certain object (e.g. conductive material capable of changing electrostatic capacity) as well as a human body. The pen touch panel may be implemented with an electromagnetic induction type panel. In this case, the pen touch panel generates a touch event in response to the gesture made by the touch stylus pen manufactured to generate a magnetic field.

The key input unit 220 is provided with a plurality of keys for receiving alphanumeric information and configuring various functions. The function keys may include menu keys, screen on/off key, power on/off key, and volume control key, etc. The key input unit 220 is capable of generating a key event to the control unit 260 in association with user setting and function control of the apparatus 200. The key events may include power on/off event, volume control event, screen on/off event, etc. The control unit 260 controls the components in response to these key events. The keys of the key input unit 220 are referred to as hard keys while the keys provided on the touchscreen 210 are referred to as soft keys.

The storage unit 230 is a secondary memory unit implemented with at least one of disc, Random Access Memory (RAM), Read Only Memory (ROM), and flash memory. The storage unit 230 is capable of storing data generated in the apparatus 200 and received from external devices through the radio communication unit 240 under the control of the control unit 160.

The storage unit 230 stores the data generated in the apparatus 200 and received from the external device (e.g. server, desktop PC, tablet PC, etc.) through the radio communication unit 240 or an external device connection interface. The storage unit 230 may store a redirect history database (DB) 231. The redirect history DB 231 is managed (i.e. stored, updated, deleted, etc.) by the control unit 260. The redirect history DB 231 is provided in the form of a table having fields of URL entry and at least one predictive URL. Here, a URL entry may be entered in the URL bar through the keypad, selected in the favorite URL list, and mapped to a link on a webpage; and the predictive URL is the URL included in the redirect message. After transmitting a request message including a URL entry to the network, the apparatus 200 receives a success message or redirect message from the network. Upon receipt of the redirect message, the control unit 260 stores the URL entry, extracts the URL from the redirect message, and registers the extracted URL as a predictive URL corresponding to the URL entry in the redirect history DB 231. Table 1 shows an exemplary redirect history DB 231.

In Table 1, the first to third predictive URLs may match the URL entry. For example, the user may enter 'www.naver.com' or select 'www.naver.com' from the favorite URL list or a link corresponding to 'www.naver.com'. In this case, 'www.naver.com' is a URL entry, and its predictive URL is 'm.naver.com'.

The storage unit 230 stores an Operating System (OS) of the apparatus 200 and various application programs. Here, the OS works as the interface between hardware and application programs and manages the computer resource such as a Central Processing Unit (CPU), a Graphics Processing Unit (GPU), a main storage device, and an auxiliary storage device. That is, the OS operates the apparatus 200, schedules the tasks, and controls operations of the CPU and the GPU. The OS also controls the execution of the application programs and storing and managing data and files.

More particularly in an exemplary embodiment of the present invention, the storage unit 230 stores the browser and HTTP message processing programs. The HTTP message processing program can be a program embedded in the browser or independent from the browser. The HTTP message processing program includes functions of managing (e.g. storing, updating, or deleting URL) the redirect history DB 231, predicting the original URL corresponding to the URL entry by referencing the redirect history DB 231, and determining whether the success message received in response to the predictive URL is of the user's intended URL.

The storage unit 230 is also capable of embedded applications and a third party application. The embedded applications are basically the applications installed in the apparatus. The embedded applications may include browser, email, instant messenger, etc. The third party applications are diverse applications that may be downloaded from the online market and installed in the apparatus 200. The third party applications may be installed and uninstalled freely. If the apparatus 200 powers on, the booting program is loaded on the main memory device (e.g. RAM) of the control unit 260. The booting program loads the OS of the apparatus 200 onto the main memory device. The OS loads the application programs on the main memory device and executes the programs selectively. Particularly in an exemplary embodiment of the present invention, if a connection with an external device is detected, the OS loads a data communication program on the main memory device and executes the data communication program. Since the booting and load process is well-known in the field of the computing field, detailed description thereon is omitted herein.

The radio communication unit 240 is responsible for voice, video, and data communication under the control of the control unit 260. For this purpose, the radio communication unit 240 is capable of including a Radio Frequency (RF) transmitter for up-converting and amplifying signals to be transmitted and an RF receiver for low noise amplifying and down-converting the received signal. The radio communication unit 240 includes at least one cellular communication module (i.e., a 3rd Generation (3G) cellular communication module, a 3.5G cellular communication module, a 4G cellular com-

TABLE 1

| URL entry | URL entry | | |
| --- | --- | --- | --- |
|  | First predictive URL | Second predictive URL | Third predictive URL |
| naver.com | www.naver.com | m.naver.com | — |
| craigslist.org | www.craiglist.org | geo.craigslist.org | seoul.craigslist.co.kr |
| ad.naver.com/image.gif | adservice1.naver.com/image.gif | — | — | munication module, etc.), a digital broadcast module (e.g. a DMB module), and a short range communication module (e.g. a Wi-Fi module and a Bluetooth module).

The audio processing unit 250 is connected with a speaker (SPK) and a microphone (MIC) and processes an audio input and output for supporting voice recognition, voice recording, digital recording, and telephony functions. The audio processing unit 250 receives audio data output from the control unit 260, converts the audio data to an analog signal, and outputs the analog signal through the speaker (SPK). The audio processing unit 250 receives the analog signal input through the microphone, converts the analog signal to audio data, and transfers the audio data to the control unit 260. The speaker (SPK) converts the analog signal from the audio processing unit 250 to output an audible sound wave. The microphone (MIC) converts the voice and other sound sources to analog signals.

The control unit 260 controls the overall operations of the apparatus 200, signal flows among the internal components of the apparatus 200, data processing, and power supply from the battery to the components. The control unit 260 includes a Central Processing Unit (CPU), a Graphic Processing Unit (GPU), etc. As is well-known in the art, the CPU is the main control unit of a computer system which performs data operation and comparison and command interpretation and execution. The GPU is the graphic control unit of performing graphic-related data operation and comparison and command interpretation and execution, instead of the CPU. Each of the CPU and the GPU may be integrated into a package of a single integrated circuit including two or more independent cores (e.g. quad-core). The CPU and GPU may also be integrated into a chip in the form of System on Chip (SoC). The CPU and the GPU may also be implemented in the form of multi-layered package. The packaged CPU and GPU may be referred to as Application Processor (AP).

The control unit 260 may include a main memory unit, e.g. RAM. Programs stored in the storage unit 230, e.g. a booting program, an OS, and applications, are loaded on the main memory unit. The CPU and GPU of the control unit 260 access the programs to interpret the commands of the programs and execute the functions depending on the interpretation result. The memory is capable of storing the data to be written to and read from the storage unit 230 temporarily. A cache memory may be separately provided as a temporary data storage.

A description is made of technical features, i.e. HTTP message processing function, according to an exemplary embodiment of the present invention hereinafter with reference to accompanying drawings.

Although it is difficult to enumerate all of the functional components that may be converged, the apparatus 200 may further includes an acceleration sensor, a gyro sensor, a GPS module, a Near Field Communication (NFC) module, a vibration motor, a camera, accessories, external device connection interfaces, etc. Here, the accessories can include a detachable device such as stylus pen for making a touch input on the touchscreen. The external device connection interface is capable of connecting an external device (e.g. another mobile device, desktop PC, laptop PC, headphone, electric charger, etc.) through wired or wireless connections for data communication under the control of the control unit 260. The apparatus 200 may be implemented with or without at least one of the aforementioned functional components and their equivalent devices.

Figure 3:
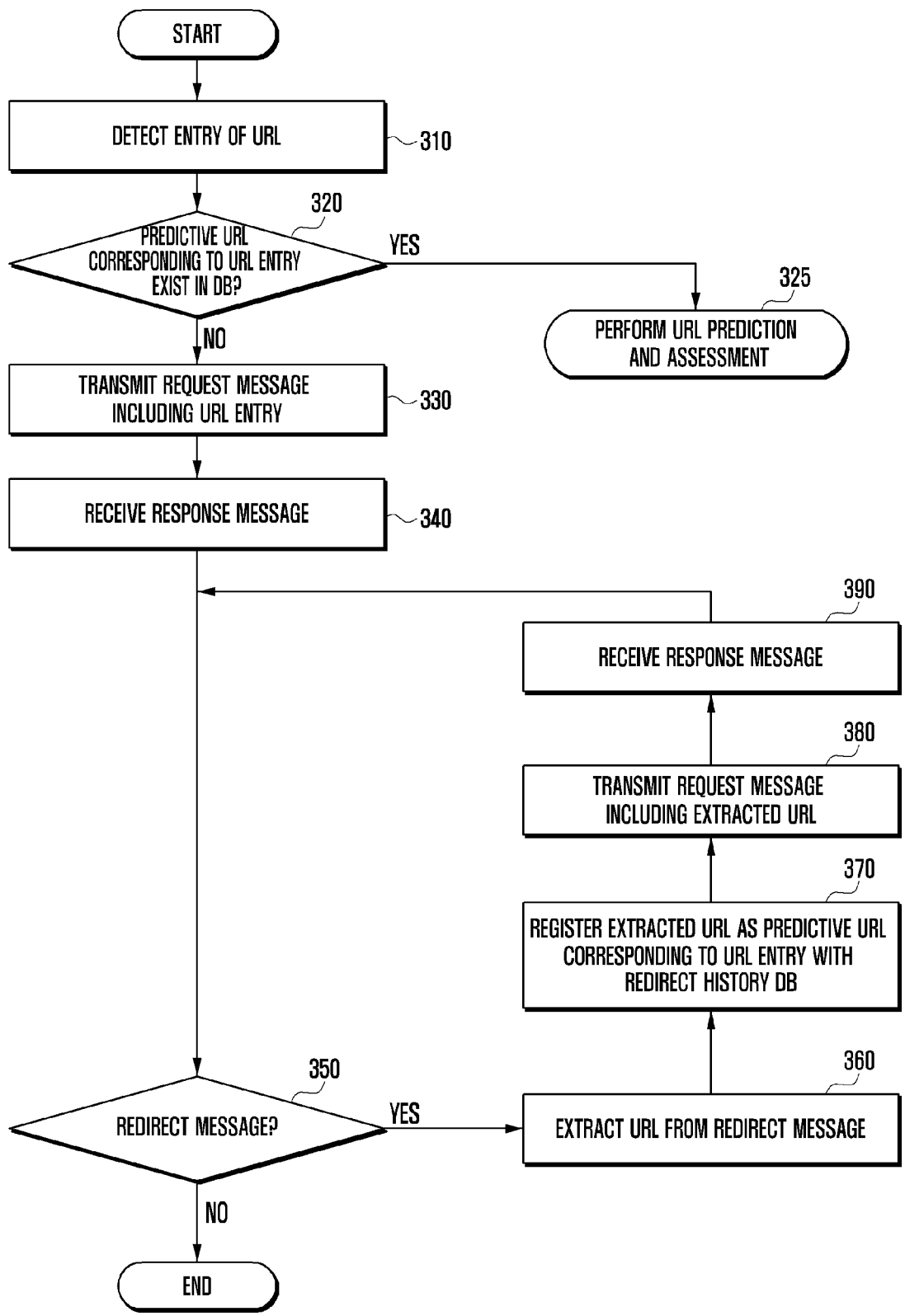
FIG. 3 is a flowchart illustrating a redirect history management procedure of an HTTP message processing method according to an exemplary embodiment of the present invention.

FIG. 3 is a flowchart illustrating a redirect history management procedure of an HTTP message processing method according to an exemplary embodiment of the present invention.

Referring to FIG. 3, the display unit 210 displays the home screen including the icon of a browser application under the control of the control unit 260. If the user taps on the browser icon, the touchscreen 211 generates a touch event to the control unit 260 in response to the tap. The control unit 260 detects the touch event on the touchscreen 211 and executes the browser in response to the touch event. Meanwhile, the display unit displays the execution screen of the browser (e.g. en empty page or a predetermined home page) under the control of the control unit 260. If the user selects the URL bar of the browser's execution screen, the control unit 260 controls the display unit 210 to present a keypad. Afterward, the control unit 260 monitors the input devices, i.e. touchscreen 211 and key input unit 220, to detect the input of a URL at step 310. Here, it is assumed that the URL is the new URL input by the user. That is, the URL is not registered with the redirect history DB 231. The URL can be input in the URL bar by manipulating the keypad or selecting from the favorite list of the browser or the URL mapped to the link on a webpage of the browser. The control unit 260 determines whether the URL entry has a predictive URL in the redirect history DB 231 at step 320. If the URL entry has a predictive URL in the redirect history DB 231, the control unit 260 performs URL prediction and assessment at step 325.

If the URL entry has no predictive URL in the redirect history DB 231, the control unit 260 controls the radio communication unit 240 to transmit a request message including the URL entry to the network at step 330. Here, the URL entry itself may not exist in the redirect history DB 231. In this case, the control unit 260 registers the URL entry with the redirect history DB 231. The control unit 260 also generates the request message including the browser information such as type of browser and location information (e.g. IP address). When such an HTTP request message is received, the server determines whether to transmit a redirect message or other message (e.g. success message including the status code '2XX') based on the URL, browser information, and location information included in the HTTP request message. In the first case when required to provide the user with an accurate URL, in the second case when required to provide the user with location-based service, or in the third case when required to perform load balancing, i.e. distribute traffic, the server sends the client a redirect message.

In an example of the first case, if the received URL is 'naver.com', the server sends the client the redirect message including 'www.naver.com'. If the browser information indicates 'web browser' for normal PC environment, the server sends the success message with the webpage corresponding to the received URL. If the received URL is 'www.naver.com' and if the received browser information is 'mobile browser', the server sends the client the redirect message including 'm.naver.com'. In an example of the second case, if the received URL is 'geo.craigslistorg' and if the received location information is 'seoul.craigslist.co.kr' as one of the domains for use in Seoul, Republic of Korea, the server sends the client the redirect message including 'seoul.craigslist.co.kr'. In an example of the third case, if a GET request message including 'ad.naver.com/image.gif' from the first client and another GET request message including 'ad/naver.com/image.gif from the second client are received simultaneously, the server sends the first client the first redirect message including 'adservice1.naver.com/image.gif' and sends the second client the second redirect message including 'adservice2.naver.com/image.gif' for distributing traffic. The control unit 260 receives the response message through the radio communication unit 240 at step 340. In an exemplary embodiment of the present invention, all the types of GET request messages include the information on the type of browser (e.g. mobile browser).

The control unit 260 determines whether the response message is a redirect message at step 350. For example, the control unit 260 parses the header of the response message to determine the status code and determines, if the status code is 3XX (e.g. '301' or '302'), and if so determines that the received response message is the redirect message. If the response message is the redirect message, the control unit 260 extracts a URL from the redirect message at step 360. Next, the control unit 260 registers the extracted URL as a corresponding predictive URL with the redirect history DB 231 at step 370. Next, the control unit 260 controls the radio communication unit 240 to transmit a request message including the extracted URL to the network at step 380. Next, the control unit 260 receives the response message through the radio communication unit 240 at step 390 and returns the procedure to step 350. The control unit 260 repeats steps 360 to 390 until a message (e.g. success message), other than redirect message, is received.

Figure 4:
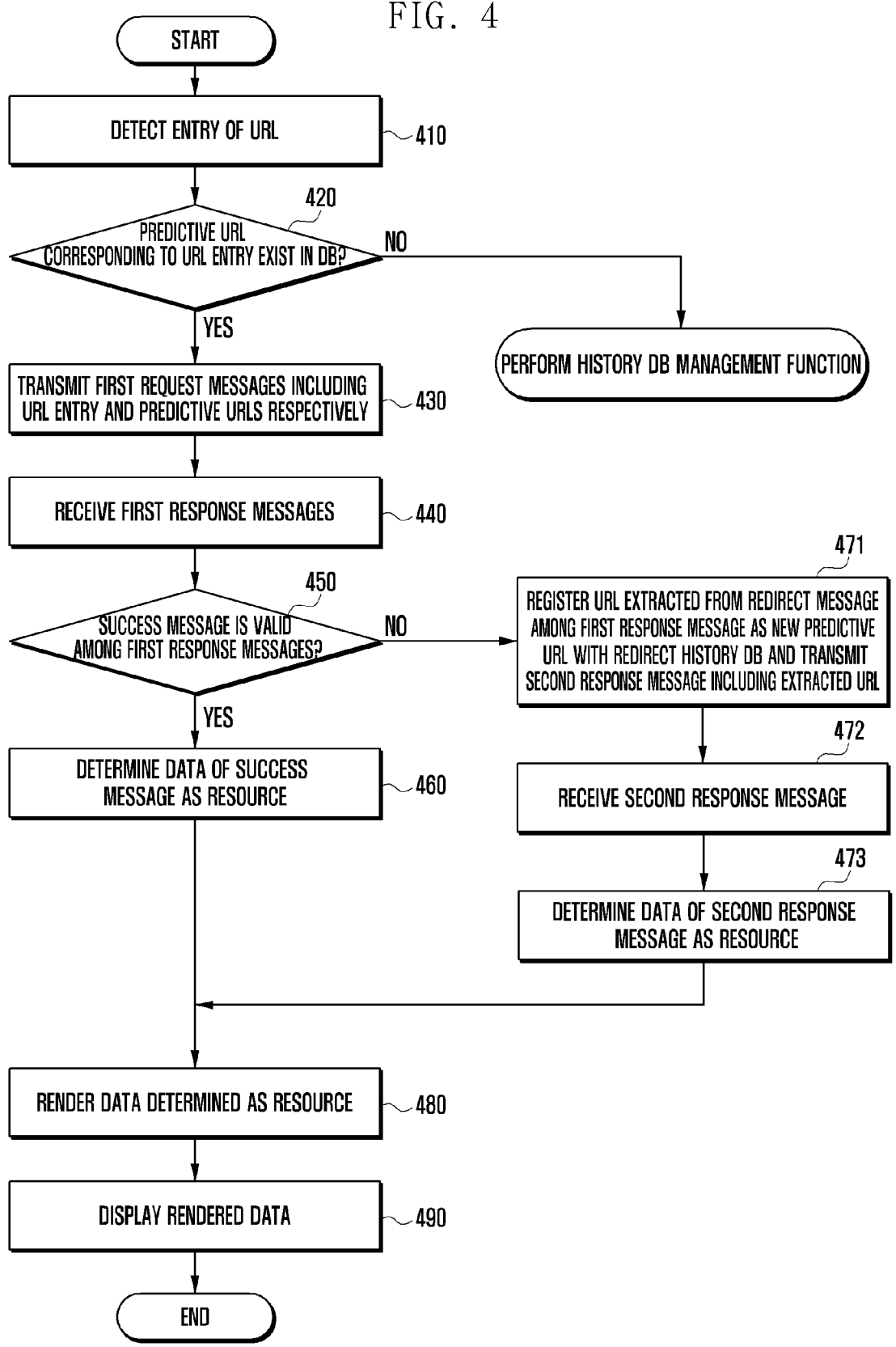
FIG. 4 is a flowchart illustrating a URL prediction and assessment procedure of an HTTP message processing method according to an exemplary embodiment of the present invention.
Figure 5:
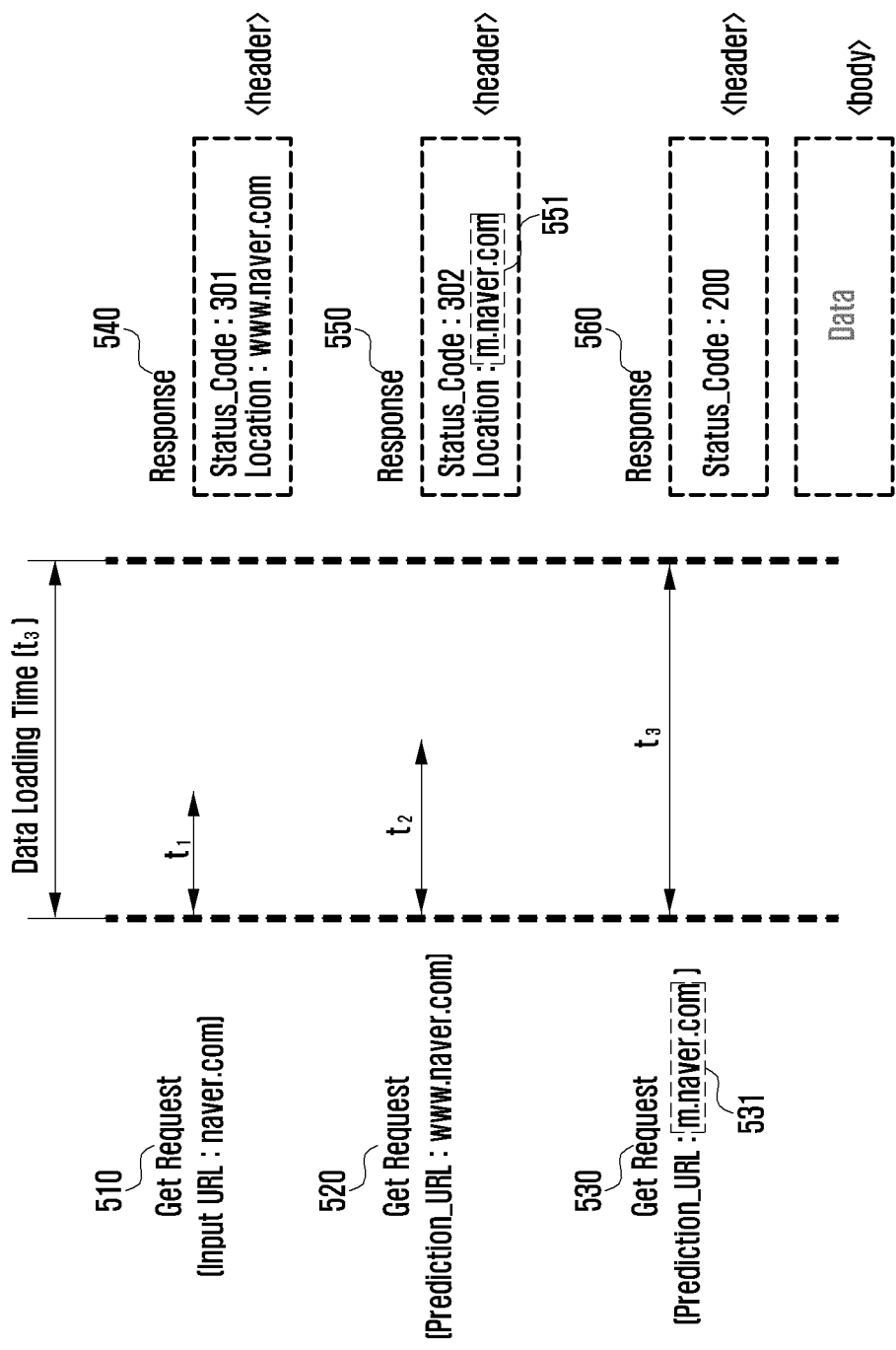
FIGS. 5 and 6 are diagrams illustrating a data loading time reduction mechanism of an HTTP message processing apparatus according to an exemplary embodiment of the present invention.
Figure 6:
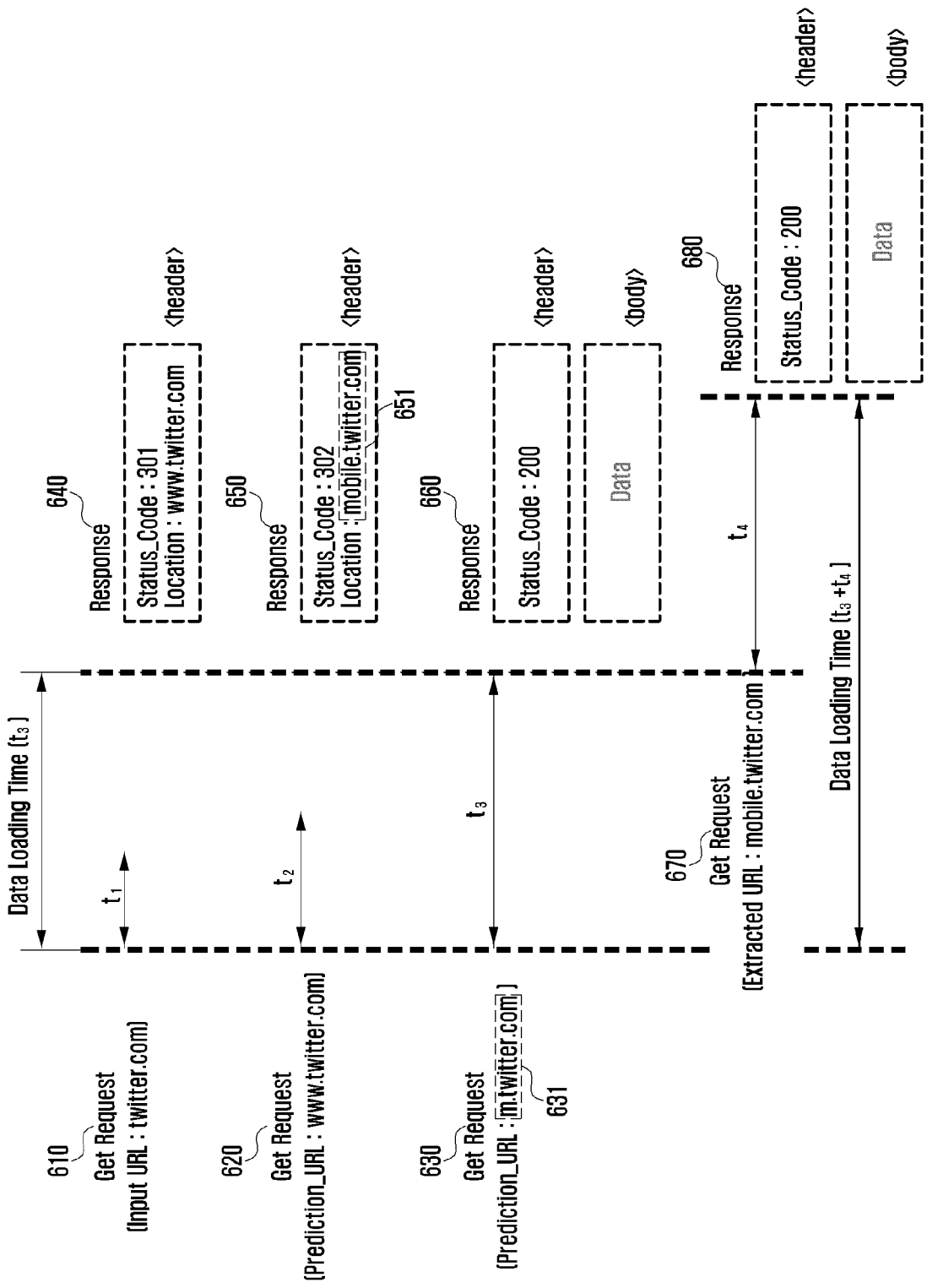

FIG. 4 is a flowchart illustrating a URL prediction and assessment procedure of an HTTP message processing method according to an exemplary embodiment of the present invention. FIGS. 5 and 6 are diagrams illustrating a data loading time reduction mechanism of an HTTP message processing apparatus according to an exemplary embodiment of the present invention.

Referring to FIG. 4, the control unit 260 detects the URL entry made by an input device, i.e. the touchscreen 211 or the key input unit 220, at step 410. The control unit 260 determines whether the URL entry has a predictive URL in the redirect history DB 231 at step 420. If the URL entry has no predictive URL, the control unit 260 performs redirect history DB management function (e.g. steps 320 to 390 of FIG. 3).

Otherwise, if the URL entry has a predictive URL in the redirect history DB 231 at step 420, the control unit 260 controls the radio communication unit 240 to transmit request messages including respective URL entry and predictive URL to the network at step 430. Here, the URL entry may have two or more predictive URLs. In an exemplary case of FIG. 5, the first GET request message 510 includes the URL entry 'naver.com', the second GET request message 520 includes the first predictive URL 'www.naver.com', and the second GET request message 530 includes the second predictive URL 'm.naver.com'. As a consequence, the first and second GET request messages 510 and 520 are the redirect request messages requesting for redirection of the respective URLs, and the third GET message 530 is the data request message requesting for the data. That is, the radio communication unit 240 is capable of transmitting at least one redirect request message and one data request message to the network simultaneously under the control of the control unit 260.

The control unit 260 receives the response messages from the network through the radio communication unit 240 at step 440.

FIGS. 5 and 6 are diagrams illustrating a data loading time reduction mechanism of an HTTP message processing apparatus according to an exemplary embodiment of the present invention.

Referring to FIG. 5, the first response message 540 includes the status code '301' and the URL 'www. naver.com', the second response message 550 includes the status code '302' and the URL 'm.naver.com' 551, and the third response message 560 includes the status code '200' and data. That is, the control unit 260 receives the redirect messages (i.e. the first and second response messages 540 and 550) in response to the redirect request messages and the success message (i.e. the third response message 560) in response to the data request message. The second response message 550 may include the status code '303' or '307'. Here, the redirect message including the status code '303' is the 'See Other' message indicating that the requested data has a problem of non-update, and the redirect message including the status code '307' is the 'Temporary Redirect' message indicating that the data has been moved temporarily.

The control unit 260 determines whether a success message is valid among the received messages at step 450. In detail, the control unit 260 extracts the URL from the redirect message (particularly, the message including status code '302') among the response messages, determines the predictive URL of the data request message corresponding to the success message, and determines, if the extracted URL and the determined predictive URL match, the success message is valid. In the exemplary case of FIG. 5, the predictive URL 531 of the third request message 530 and the URL 551 of the second response message 550 match each other and thus the control unit 260 determines that the third response message 560 is valid. If the success message is valid, the control unit 260 determines that the data of the success message as resource at step 460. That is, the control unit 260 regards the third message 560 as the valid message carrying the data requested by the user. Suppose that the time taken in transmitting the first request message 510 and receiving the first response message 540 (i.e. first redirect request/response time) is t1, the time taken in transmitting the second request message 520 and receiving the second response message 550 (i.e. second redirect request/response time) is t2, and the time taken in transmitting the third request message 530 and receiving the third response message 560 (i.e. data request/response time) is t3. If these messages are transmitted and received separately, the total data loading time is t1+t2+t3. However, the URL prediction and assessment procedure according to an exemplary embodiment of the present invention is capable of performing redirect request/response and data request/response simultaneously, thereby cutting short the data loading time to t3.

Meanwhile, the success message received at step 440 may not valid.

Referring to FIG. 6, the radio communication unit 240 sends to the network the first GET request message 610 including the URL entry 'twitter.com', the second GET request message 620 including the first predictive URL 'www.twitter.com', and the third GET request message 630 including the second predictive URL 'm.twitter.com' simultaneously under the control of the control unit 260. In response to these three request messages 610, 620 and 630, the server sends the first to third response messages 640, 650, and 660. The control unit 260 receives the first to third response messages 640, 650, and 660 through the radio communication unit 240. Since the predictive URL 631 of the third request message 630 corresponding to the third response message 660 and the URL 651 of the second response message 650 mismatch, the control unit 260 determines that the third response message 660 is invalid. If it is determined that the success message is invalid, the control unit 260 registers the URL extracted from the redirect message (particularly, the message including status code '302') among the response messages as a new predictive URL with the redirect history DB 231 at step 471. Referring to the exemplary case of FIG. 6, the control unit 260 deletes 'm.twitter.com' 631 and registers 'mobil.twitter.com' 651 with the redirect history DB 231 instead. The control unit 260 also controls the radio communication unit 240 to send to the network a fourth request message 670 including the extracted URL at step 471. The control unit 260 receives the success message, i.e. the fourth response message 680 through the radio communication unit 240 at step 472. If the success message received at step 440 is invalid, the total data loading time increases as much as the time taken in transmitting the fourth request message 670 and receiving the fourth response message 680, i.e. t4. That is, the total data loading time becomes t3+t4. The control unit 260 determines the data of the success message received at step 472 as a resource at step 473.

The control unit 260 renders the data determined as resource at step 473 into an image at step 480 and controls the display unit 210 to display the rendered image at step 490.

As described above, the HTTP message processing method and apparatus of the exemplary embodiments of the present invention are capable of predicting the original URL corresponding to the URL requested by the user or the apparatus so as to present the user-intended data to the user quickly.

The above-described dormancy mode control method of a portable terminal according to the present invention may be recorded in a computer-readable storage media in the form of program commands executable by various types of computing means. Here, the computer-readable storage media can store the program commands, data files, and data structures independently or in the form of their combination. The program commands recorded in the storage media may be designed and configured for dedicated use in the present invention or the ones well-known to those in the computer software field. The computer-readable media may be magnetic media such as a hard disk, a floppy disk and magnetic tape, optical media such as a Compact Disk Read-Only Memory (CD-ROM) and a Digital Versatile Disk (DVD), magneto-optical media such as floptical disk, and hardware devices such as a ROM, a Random-Access Memory (RAM), a flash memory, etc., particularly implemented to store and execute program commands. The program commands may be machine language codes produced by a compiler and high-level language codes that can be executed by computers using an interpreter, etc. In order to perform the operations of the present invention, the hardware devices may be implemented to operate as at least one software module, and vice versa.

While the invention has been shown and described with reference to certain exemplary embodiments thereof, it will be understood by those skilled in the art that various changes in form and details may be made therein without departing from the spirit and the scope of the invention as defined by the appended claims and their equivalents.

What is claimed is:

1. A method of processing a HyperText Transfer Protocol (HTTP) message in an apparatus capable of connecting to a network, the method comprising:
    detecting a respective Uniform Resource Locator (URL) entry;
    transmitting, by the apparatus, when at least one predictive URL corresponding to the respective URL entry exists in a redirect history database (DB), to the network the respective URL entry and the at least one predictive URL;
    receiving a response message which determines whether the at least one predictive URL is valid from the network in response to the respective URL entry and the at least one predictive URL;
    determining, by the apparatus, whether the at least one predictive URL is valid based on the received response messages; and
    determining, by the apparatus, when the at least one predictive URL is valid, data carried in the response message as a resource to be presented to a user,
    wherein the determining whether the at least one predictive URL is valid comprises:
        extracting a URL from a redirect message included in the response message;
        determining whether the predictive URL corresponds to the extracted URL from the redirect message; and
        verifying validity of the predictive URL when determined that the extracted URL and the determined predictive URL match and verifying invalidity of the predictive URL when determined that the extracted URL and the determined predictive URL mismatch.

2. The method of claim 1, wherein the extracting of the URL from the redirect message comprises extracting the URL from at least one redirect message including one of status codes of 302, 303, and 307.

3. The method of claim 1, further comprising:
    transmitting, when the at least one predictive URL is invalid, to the network the extracted URL;
    receiving another response message in response to the extracted URL; and
    determining the data of the extracted URL as the resource to be presented to the user.

4. The method of claim 1, further comprising registering, when the at least one predictive URL is invalid, the extracted URL as a predictive URL with the redirect history DB.

5. The method of claim 1, further comprising:
    transmitting, by the apparatus, when no predictive URL corresponding to the URL entry exists in the redirect history DB, to the network the URL entry;
    receiving another response message which determines whether the URL entry is valid from the network in response to the URL entry;
    extracting, by the apparatus, when the other response message includes the redirect message, a URL from the redirect message included in the other response message; and
    registering the extracted URL, as a predictive URL corresponding to the URL entry, with the redirect history DB.

6. An apparatus of processing a HyperText Transfer Protocol (HTTP) message, the apparatus comprising:
    touchscreen which receives a respective Uniform Resource Locator (URL) entry;
    a radio communication transceiver which transmits to a network the respective URL entry and at least one predictive URL when the at least one predictive URL corresponding to the URL entry exists in a redirect history database (DB), and receives a response message which determines whether the at least one predictive URL is valid from the network in response to the respective URL entry and the at least one predictive URL; and
    a control unit comprising a processor which determines whether the at least one predictive URL is valid based on the received response message and determines, when the at least one predictive URL is valid, data carried in the response message as a resource to be presented to a user,
    wherein the control unit extracts a URL from a redirect message included in the response message, determines the predictive URL corresponds to the extracted URL from the redirect message, and verifies validity of the predictive URL when determined that the extracted URL and the determined predictive URL match and verifies invalidity of the predictive URL when determined that the extracted URL and the determined predictive URL mismatch.

7. The apparatus of claim 6, wherein the control unit extracts the URL from at least one redirect message including one of status codes of 302, 303, and 307.

8. The apparatus of claim 6, wherein the control unit controls the radio communication unit to transmit, when the predictive URL is invalid, to the network the extracted URL and to receive another response message in response to the extracted URL and determines the data of the extracted URL as the resource to be presented to the user.

9. The apparatus of claim 6, wherein the control unit registers, when the predictive URL is invalid, the extracted URL as a predictive URL with the redirect history DB.

10. The apparatus of claim 6, wherein the control unit controls the radio communication unit to transmit, when no predictive URL corresponding to the URL entry exists in the redirect history DB, to the network the URL entry and receives another response message which determines whether the URL entry is valid from the network in response to the URL entry, extracts, by the apparatus, when the other response message includes the redirect message, a URL from the redirect message included in the other response message, and registers the extracted URL, as a predictive URL corresponding to the URL entry, with the redirect history DB.

11. An apparatus of processing a HyperText Transfer Protocol (HTTP) message, the apparatus comprising:
    an touchscreen which receives a Uniform Resource Locator (URL) entry;
    a memory storing a redirect history database (DB) having URL entry fields and predictive URLs;
    a radio communication transceiver which transmits to a network the URL entry and a predictive URL, stored in the redirect history DB, corresponding to the URL entry, and receives a response message which determines whether the predictive URL is valid from the network in response to the URL entry and the predictive URL; and
    a control unit comprising a processor which determines whether the predictive URL is valid based on the received response message and determines, when the predictive URL is valid, data carried in the response message as a resource to be presented to a user,
    wherein the control unit extracts a URL from a redirect message included in the response message, determines the predictive URL corresponds to the extracted URL from the redirect message, and verifies validity of the predictive URL when determined that the extracted URL and the determined predictive URL match and verifies invalidity of the predictive URL when determined that the extracted URL and the determined predictive URL mismatch.

12. The apparatus of claim 11, wherein the control unit extracts the URL from the redirect message including one of status codes of 302, 303, and 307.

13. The apparatus of claim 11, wherein the control unit controls the radio communication unit to transmit, when the predictive URL is invalid, to the network the extracted URL and to receive another response message in response to the extracted URL and determines the data of the extracted URL as the resource to be presented to the user.

14. The apparatus of claim 11, wherein when the predictive URL is invalid, the control unit registers the extracted URL as a predictive URL with the redirect history DB.

15. The apparatus of claim 11, wherein the control unit controls the radio communication unit to transmit to the network the URL entry when no predictive URL corresponding to the URL entry exists in the redirect history DB, and receives another response message which determines whether the URL entry is valid from the network in response to the URL entry, extracts, by the apparatus, a URL from the redirect message included in the other response message, when the other response message includes the redirect message, and registers the extracted URL, as a predictive URL corresponding to the URL entry, with the redirect history DB.

* * * * *